3,284,550
ULTRAHIGH PURITY CARBIDE FORMATION
Robert E. Riley and Keith V. Davidson, both of Los Alamos, N. Mex., assignors to the United States of America as represented by the United States Atomic Energy Commission
No Drawing. Filed Mar. 28, 1966, Ser. No. 538,906
4 Claims. (Cl. 264—.5)

The invention described herein was made in the course of, or under, a contract with the U.S. Atomic Energy Commission.

This invention relates to a method of forming carbides and, more particularly, to a method of forming carbides which are of the desired stoichiometry and free of vestigial segregates and secondary phases.

In the prior art methods of forming carbides, ultrahigh purity carbides such as those obtained utilizing the present invention could not be made. The presence of vestigial segregates such as free carbon and oxygen is undesirable in many applications. For example, thermionic emitters, such as the UC-ZrC system described in copending application Ser. No. 337,967, filed by Grover et al. on December 27, 1963, when exposed to a cesium atmosphere, are incompatible with free oxygen or carbon. The presence of interstitial oxygen or carbon results in structural failure of the emitter after a short period of time. Other examples where the presence of oxygen or carbon is undesirable are found in preparing materials for oxygen analysis and in calibrating characteristics of pure carbides as analytical standards.

Carbides of uranium and zirconium in solid solution having various uranium contents are of interest as a nuclear material capable of functioning at extremely high temperatures. Subsolidus transformations, such as phase changes or precipitations, impose limitations on the practical applications of these materials. For reasons of compatibility, stoichiometric UC-ZrC solid solutions are essential; i.e., vestigial segregates such as free carbon and secondary phases such as $U_2C_3$ or $UC_2$ cannot be tolerated.

According to the present invention, ultrahigh purity carbides are formed by arc-melting the elemental constituents, heating in a vacuum, crushing and again heating in a vacuum.

An object of the present invention is to prepare ultrahigh purity carbides or solid solutions thereof which are substantially free of vestigial segregates such as interstitial oxygen and carbon.

Other objects of the invention will be apparent to one skilled in the art from a reading of the following specification.

The first materials system to be utilized was $$(UC)_x(ZrC)_y$$

The starting material for $U^{235}$ and $U^{238}$ was uranium metal in .02-in. and .08-in. sheets. The sheet was electropolished and subsequently given an $HNO_3$ each prior to subsequent processing. The metal strips were immediately loaded into a 2-in. I.D. Pyrex furnace tube. The system was evacuated to $10^{-5}$ torr, outgassed at 400–450° C., then cooled to 260° C., at which point hydrogen gas at just under 1 atm. pressure was admitted.

The hydrogen used was either the ultrahigh purity grade (Sigma 10 p.p.m. impurities) or was tank hydrogen purified by passing the gas through a De Oxo unit, a BaO drying column, and a uranium metal chip purifying train at 600–700° C.

After hydriding, the powder was dehydrided under vacuum at 400° C. and was subsequently rehydrided to form a loose powder. Upon completion of the rehydriding, the reaction tube was evacuated at room temperature and transferred to the air lock of a dry box.

The lock was evacuated and back-purged with helium twice and sampled for oxygen before the material was transferred to the working area of the dry box. The contents were then removed from the tube, hand-crushed with a tungsten carbide mortar and pestle, screened through —325 mesh, sampled for analysis, and bottled in plastic containers for storage in the dry box. It was evident that the oxygen content was extremely high, varying from as low as 6400 p.p.m. to as high as 18,000 p.p.m. It was obvious that the uranium hydride was an excellent getter for oxygen. The material was then given a final dehydriding treatment in vacuum at 400° C. This final dehydriding treatment in vacuum lowers the oxygen content of the resulting uranium powder as compared with the amount of oxygen still present in the $UH_3$.

The zirconium metal (hafnium free) was purchased as iodide crystal bar. The bars, approximately ¾ in. hexagonal x 4 ft. long, were broken into ¾ in. lengths and acid cleaned in a $HF+5\%$ $HNO_3$ solution to remove the oxide scale from the surface.

The material was button arc-melted into plates 2¼ in. x 3¼ in. x ½ in. Each plate was melted four times and was flipped over between melts. Magnetic stirring (15 gauss) was used to stabilize the arc. The plate was cold-rolled to 0.090-in. thick sheet, cleaned in acid, washed and dried with acetone, and sheared for charge material.

The carbon used in the preparations was grade SP–1 special high purity spectrographic graphite. This material was screened through 325 mesh with no crushing operation. Powder larger than 325 mesh was discarded.

After trying various approaches to prepare solid solution carbide powders free of extraneous phases, it was decided that the powders would be made by arc-melting the elemental materials of uranium, zirconium and carbon into button form and solution-treating the melted button to eliminate the cored structure which is typical of a cast material.

The development of the arc-melting technique was not without its problems. A mass effect was evidenced in arc-melting 100 g. buttons due to the very high melting point of the alloy and the quantity of material involved. This problem was eliminated by going to a smaller charge of 25 g.

The buttons were produced by arc-melting the elemental constituents. The charge consisted of stoichiometric quantities except for carbon which was 5% in excess to compensate for carbon loss by vaporization during melting. Actual melting procedure for these charges was six 5-min. melts. The buttons were turned over after each melt and maximum magnetic stirring power (45 gauss) was used at all times to improve homogeneity. It should be noted that while magnetic stirring is desirable it is by no means a necessary procedure. The charges were placed in the cavity and the furnace closed and evacuated to less than 1μ. Zirconium metal was placed in one of the cavities and was used to strike the arc as well as act as a getter. Actual melting was performed in a purified argon atmosphere at a pressure of 19 in. Hg absolute. Barium oxide was used for moisture removal, and zirconium sponge at a temperature of 800° C. was used to remove gaseous impurities from the argon gas.

A homogenization thermal treatment consisted of solution-treating the buttons in vacuum for 2000° C. for 24 hr. The solution-treated buttons were crushed through 20 mesh, blended, and sampled for chemistry, X-ray diffraction, and metallography. A marked improvement as a result of solution-treatment was apparent, but free carbon was still quite high and some extraneous phases were still present.

Following solution treatment at 2000° C. for 24 hr. in vacuum, analytical results showed that considerable free carbon was still present (even though there was no metallographic evidence of free carbon). Metallography of the arc-cast buttons showed solid solution $$(UC)_{.18}(ZrC)_{.82}$$

plus 1–8% extraneous phases, the second phases generally consisting of approximately 90% grey phase (presumably $UC/UC_2$).

All $(UC)_x(ZrC)_y$ arc-melted buttons were crushed in a dry box system. An argon atmosphere was used. A WC mortar and pestle were used to crush the arc-melted buttons to −20 mesh powder. After solution-treatment the powder was screened through 200 mesh. All +200 mesh powder was ball-milled in a uranium mill with uranium balls. Milling and screening was repeated on the +200 mesh material until all of it passed through the 200 mesh screen.

Treatment for 24 hrs. at 2000° C. in vacuum was arbitrarily chosen, and the results show that this was not sufficient for complete homogenization. X-ray diffraction showed the material to be single phase, solid solution, face-centered cubic, with lattice dimensions corresponding to those of a (UZr)C solid solution phase. The diffuseness of the high-angle diffraction lines in the diffraction photographs suggests some compositional variation on a micro scale.

A second thermal treatment consisting of 2000° C. for 24 hrs. in vacuum was imposed on the crushed powder in an attempt to further homogenize the powder and eliminate the extraneous phases. The advantages of such a treatment become immediately apparent upon examining the data in Table I. The chemistry of the major constituents is approaching the desired stoichiometry, free carbon has been greatly reduced, and in all cases metallography and X-ray diffraction showed sharp high-angle diffraction lines. It should be pointed out that 500 p.p.m. carbon is the minimum quantity which can be accurately determined by present analytical techniques. The interstitial content (oxygen) is quite low in comparison to solid solution $(UC)_x(ZrC)_y$ made by various other techniques. The feasibility of making solid solution $$(UC)_x(ZrC)_y$$

free of extraneous phases has been fully demonstrated.

Referring to Table I, powder loads 1–6 were all 25 g. charges consisting of 8.20 g. U, 14.48 g. Zr, and 2.44 g. C. All are stoichiometric quantities except for C which is 5% or 0.12 g. excess to compensate for C loss by vaporization melting. Melting procedure for these charges consisted of six 5-min. melts, for a total of 30 min. per button, at a power of 300 amps. and 20 volts. The button was turned over after each 5-min. melt. Maximum stirring power was used at all times to improve the homogeneity of the cast button.

*Table I*

ANALYTICAL RESULTS OF ARC-MELTED $(UC)_x(ZrC)_y$

[Arc-cast and sol.-treated as button 24 hrs. at 2,000° C. in vac.+crushed and sol.-treated as powder 24 hrs. at 2,000° C. in vac.]

| Powder Lot | Arc-Cast Button Size, g. | U, Percent | Zr, Percent | Total C, Percent | Free C, p.p.m. | $O_2$, p.p.m. | X-ray Diff.[a] | Metallographic Phase Identification[a] |
|---|---|---|---|---|---|---|---|---|
| $(U^{235})_{.18}(ZrC)_{.82}$ | Nominal | 32.78±0.03 | 57.94±0.03 | 9.28±0.03 | | | SPSS | SPSS |
| 1 | 25 | 32.8 | 57.8 | 9.24 | <500 | | SPSS | SPSS |
| 2 | 25 | 32.9 | 57.4 | 9.24 | 600 | | SPSS | SPSS |
| 3 | 25 | 31.9 | 58.2 | 9.24 | 680 | | SPSS | SPSS |
| 4 | 25 | 32.0 | 57.8 | 9.28 | <500 | | SPSS | SPSS |
| 5 | 25 | 32.6 | 57.1 | 9.32 | 680 | | SPSS | SPSS |
| 6 | 25 | 32.4 | 56.6 | 9.34 | 820 | | SPSS | SPSS |
| 7 | 25 | 32.3 | 57.5 | 9.26 | <500 | 700 | SPSS | SPSS |
| $(U^{238}C)_{.18}(ZrC)_{.82}$ | Nominal | 33.05±0.03 | 57.70±0.03 | 9.25±0.03 | | | | |
| 8 | 25 | 33.3 | 57.0 | 9.20 | <500 | | SPSS | SPSS |
| 9 | 25 | 33.3 | 57.5 | 9.21 | 540 | | SPSS | SPSS |
| 10 | 25 | 33.6 | 57.3 | 9.15 | <500 | | SPSS | SPSS |
| 11 | 25 | 33.5 | 57.1 | 9.22 | <500 | | SPSS | SPSS |
| 12 | 25 | 33.3 | 57.3 | 9.24 | <500 | | SPSS | SPSS |
| 13 | 25 | 33.6 | 57.2 | 9.18 | 520 | 1,120 | SPSS | SPSS |
| 14 | 25 | 32.8 | 57.7 | 9.19 | <500 | | SPSS | SPSS |

[a] SPSS—single phase solid solution $(UC)_x(ZrC)_y$.

What is claimed is:

1. A method of forming ultrahigh purity carbide free of vestigial segregates which comprise: (a) arc-melting the elemental constituents, (b) heating to about 2000° C. in vacuum, (c) crushing, and (d) again heating to 2000° C. in vacuum.

2. A method of forming ultrahigh purity carbides as in claim 1 wherein the elemental constituents are uranium, zirconium and carbon so that a solid solution carbide of UC/ZrC is formed.

3. A method of forming ultrahigh purity carbides as in claim 2 wherein the heating steps were held at 2000° C. for about 24 hrs. each.

4. A method of forming ultrahigh purity carbides as in claim 2 wherein magnetic stirring is used during arc-melting.

References Cited by the Examiner

UNITED STATES PATENTS 3,207,697    9/1965    Friedrick et al. _____ 252—301.1

BENJAMIN R. PADGETT, *Primary Examiner.*

S. J. LECHERT, JR., *Assistant Examiner.*